United States Patent
Moilanen

(10) Patent No.: US 8,238,322 B2
(45) Date of Patent: Aug. 7, 2012

(54) OPTIMIZING OF CHANNEL ALLOCATION IN A WIRELESS COMMUNICATIONS SYSTEM

(75) Inventor: Jani Moilanen, Helsinki (FI)

(73) Assignee: Nokia Corporation, Espoo (FI)

( * ) Notice: Subject to any disclaimer, the term of this patent is extended or adjusted under 35 U.S.C. 154(b) by 1357 days.

(21) Appl. No.: 11/479,874

(22) Filed: Jun. 30, 2006

(65) Prior Publication Data
US 2008/0004029 A1  Jan. 3, 2008

(51) Int. Cl.
 *H04B 7/212* (2006.01)
(52) U.S. Cl. .................. 370/348; 370/344
(58) Field of Classification Search .......... 370/337, 370/347, 348, 422, 468, 464, 465, 469
See application file for complete search history.

(56) References Cited

U.S. PATENT DOCUMENTS

| | | | |
|---|---|---|---|
| 6,356,759 B1 * | 3/2002 | Mustajarvi | 455/450 |
| 2001/0030956 A1 * | 10/2001 | Chillariga et al. | 370/348 |
| 2005/0002374 A1 * | 1/2005 | Beard et al. | 370/347 |
| 2005/0250506 A1 * | 11/2005 | Beale et al. | 455/452.1 |

FOREIGN PATENT DOCUMENTS

| | | |
|---|---|---|
| GB | 2403102 | 12/2004 |
| WO | WO 01/50782 | 7/2001 |
| WO | WO 2005/107304 | 11/2005 |
| WO | WO 2006/133811 | 12/2006 |

OTHER PUBLICATIONS

Chuxiang Li et al., *Adaptive Subchannel Allocation in Multiuser MC-CDMA Systems*, Global Telecommunications Conference, 2004. GLOBECOM '04, IEEE vol. 4, Nov. 29-Dec. 3, 2004, pp. 2503-2507.

* cited by examiner

*Primary Examiner* — Huy D Vu
*Assistant Examiner* — Dady Chery
(74) *Attorney, Agent, or Firm* — Squire Sanders (US) LLP

(57) ABSTRACT

The Orthogonal Frequency Division Multiple Access OFDMA and Orthogonal Frequency Division Multiplexing OFDM techniques involve transmitting so called map messages in order to inform user terminals which slots are allocated to them. The large size of the map messages may constitute a problem in the system, and thus the present solution intends to alleviate this problem. The idea is to use semi-static allocation maps, wherein a location, size, and modulation and coding method of allocated slots are predefined for a connection. Then, the present solution allows defining validity information indicating which of the predefined allocations are to be used for a current frame.

34 Claims, 2 Drawing Sheets

OPTIMIZING OF CHANNEL ALLOCATION IN A WIRELESS COMMUNICATIONS SYSTEM

FIELD OF THE INVENTION

The present invention relates to resource reservation in a radio access system, and more particularly to a method of assigning transmission channels.

BACKGROUND OF THE INVENTION

Orthogonal Frequency Division Multiple Access OFDMA is a multiple access technique that has started to gain attention in wireless radio access systems. For example, the IEEE 802.16e standard (also known as the WiMAX (Worldwide Interoperability for Microwave Access) standard) utilizes the OFDMA for its physical layer both in downlink and uplink. Also the future evolutions of 3G (third generation) cellular systems, such as 3.9G or 4G systems, are presumably adopting OFDMA, at least for the downlink part. A channel allocation in an OFDMA system has both a time dimension and a frequency dimension. The smallest possible channel allocation unit is called a slot referring to a contiguous block of m logical sub-channels and n OFDM (Orthogonal Frequency Division Multiplexing) symbols, where m and n are integers. In the OFDMA, a single OFDM symbol may contain transmissions to/from several mobile stations. A logical sub-channel may contain several physical sub-carriers (which do not necessarily have to be adjacent to each other). In the OFDMA the possibility of dynamically dividing a single OFDM symbol between several terminals gives more freedom for channel allocation compared e.g. to normal OFDM based systems where each (unicast) symbol is dedicated to one terminal.

However, this freedom of the OFDMA also has drawbacks. For example, a terminal has to be able to identify the slots reserved for it. Therefore, a so-called map message is included in each transmitted frame in order to inform the terminals of the allocations related to them. The large size of the map messages has become one of the bottlenecks of the OFDMA-based systems, such as WiMAX or 3.9G systems. This problem is emphasized particularly if there are a lot of terminals that require small but steady throughput. Examples of such terminals include the ones using VoIP (Voice over IP (Internet Protocol)) services. In some cases, the map messages may even take tens of percents of the frame capacity, thus significantly reducing the available system capacity. In addition, the larger the map message becomes, the more likely it is that errors occur in its reception. If a terminal is not able to receive map messages, it will not be able to receive/send any data. In other words, large map messages result in a lowered spectral efficiency and higher packet error rates. In the WiMAX, these allocations are grouped into bursts, and the location of the bursts is then identified in the map messages sent at the beginning of each physical frame.

One possibility of reducing the size of the map message is to define a static allocation of slots. For example, at the beginning of a VoIP call, it can be agreed that certain slots are always allocated to the terminal with a certain sequence (for example, first two slots in every third frame). However, that kind of solution is not able to adjust to changes, such as silent periods in the VoIP call or variations in channel quality.

BRIEF DESCRIPTION OF THE INVENTION

An object of the present invention is thus to provide a method, a system and a base station for implementing the method so as to alleviate the above disadvantages. The objects of the invention are achieved by a method and an arrangement, which are characterized by what is stated in the independent claims. The preferred embodiments of the invention are disclosed in the dependent claims.

The idea of the invention is that instead of defining a location of an allocated slot in a frame in a static way or fully dynamically, the user terminal is provided with information on predefined allocations, and a bitmap included in the map message is used to inform the terminal which of the predefined allocations are valid in the current frame.

An advantage of the method and arrangement of the present invention is that it describes a solution for the OFDMA channel allocation in which the map message sizes can be minimized, while still having a possibility of making dynamic changes in the channel allocation.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
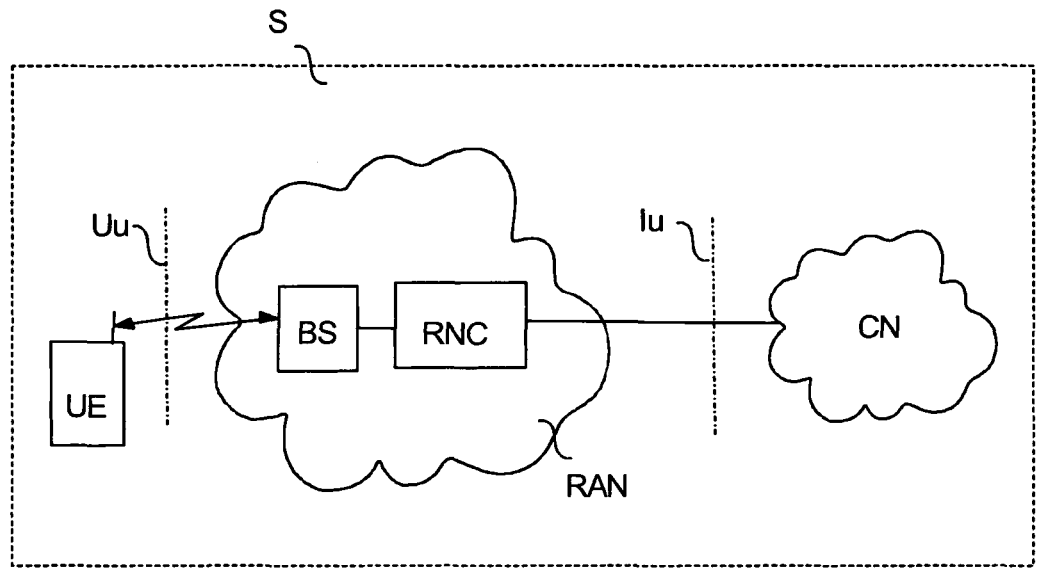
FIG. 1 illustrates a cellular communications system according to an embodiment of the invention.

In the following, preferred embodiments of the invention will be described with reference to a third generation mobile communications system, such as the UMTS (Universal Mobile Communications System). This invention is not, however, meant to be restricted to these embodiments. Consequently, the invention may be applied in any mobile communications system that provides packet switched radio service capable of providing OFDMA and/or OFDM techniques. Examples of other systems include the IMT-2000 and its evolution techniques (such as the 3.9G or 4G), or the like, such as the WiMAX or the DCS 1800 (Digital Cellular System for 1800 MHz). The specifications of mobile communications systems and particularly those of the IMT-2000 and the UMTS advance rapidly. This may require additional changes to the invention. For this reason, the terminology and the expressions used should be interpreted in their broadest sense since they are meant to illustrate the invention and not to restrict it. The relevant inventive aspect is the functionality concerned, not the network element or equipment where it is executed.

The WiMAX has been defined by the WiMAX Forum to promote conformance and interoperability of the IEEE 802.16 standard. The WiMAX refers to a wireless technology that provides high-throughput broadband connections over long distances. It can be used for a number of applications, including last mile broadband connections, hotspots and cellular backhaul, and high-speed enterprise connectivity for business. The original WiMAX standard IEEE 802.16 utilizes OFDMA and scheduled MAC (Media access control), thus enhancing the robustness and reliability of wireless mesh networks. The IEEE 802.16 standard specifies the WiMAX within the 10 to 66 GHz range. The IEEE 802.16a standard added support for the 2 to 11 GHz range. The WiMAX provides increased bandwidth and stronger encryption. It makes use of multi-path signals, and enables providing connectivity between network endpoints without direct line of sight.

Orthogonal Frequency Division Multiplexing (OFDM) is an FDM (frequency division multiplexing) modulation technique for transmitting large amounts of digital data over a radio wave. The OFDM operates by splitting a radio signal into multiple smaller sub-signals that are then transmitted simultaneously to the receiver at different frequencies. The OFDM enables reducing the amount of disturbance in signal transmissions. The IEEE 802.16 and 802.16a technologies utilize OFDM. The OFDM may also be called discrete multi-tone modulation (DMT), where each frequency channel is modulated with a simpler modulation. In OFDM, the frequencies and the modulation of FDM are arranged to be orthogonal with each other in order to minimize the interference between channels. A useful benefit is multi-path resistance which arises when data is coded with a forward error correction (FEC) scheme prior to modulation called channel coding. This is called coded OFDM (COFDM).

Orthogonal Frequency Division Multiple Access (OFDMA) is a multiple access scheme for OFDM systems. It works by assigning a subset of subcarriers to individual users. The OFDMA is a multi-user version of OFDM. It functions by partitioning the resources in the time-frequency space, by assigning units along the OFDM signal index and OFDM sub-carrier index. Each OFDMA user transmits symbols using sub-carriers that remain orthogonal to those of other users. More than one sub-carrier can be assigned to a single user to support high rate applications. The OFDMA allows simultaneous transmission from several users and a better spectral efficiency. Multi-user interference may be introduced if there is frequency synchronization error.

FIG. 1 illustrates a communication system according to an embodiment of the present solution. FIG. 1 shows a simplified version of the UMTS architecture, which illustrates only the components that are essential to the invention, even though those skilled in the art naturally know that a general mobile communication system also comprises other functions and structures, which do not have to be described in more detail herein. The main parts of the UMTS are a core network CN, a radio access network RAN and a user terminal UE, also referred to as user equipment UE. The interface between the CN and the RAN is called an Iu interface and the air interface between the RAN and the user terminal UE is called a Uu interface. The Uu interface is a radio interface. The RAN is a theoretical concept for the radio network and it identifies the network part between the Iu and Uu interfaces, comprising radio network controllers RNC and base stations BS. The user terminal UE can be a simplified terminal intended only for speech data, or it can be a terminal for multiple services operating as a service platform and supporting the loading and execution of different service-related functions. The direction of transmission in which the mobile station transmits and the base station BS receives is called uplink (UL) or reverse link, and the physical link from the transmitting base station BS towards the receiving user terminal UE is called downlink (DL) or forward link.

Figure 2:
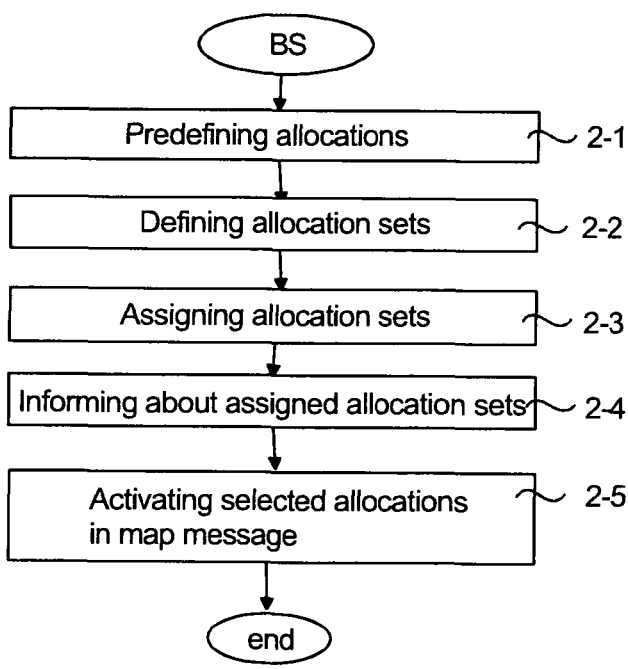
FIG. 2 is a flow chart illustrating the method according to an embodiment of the invention.
Figure 3:
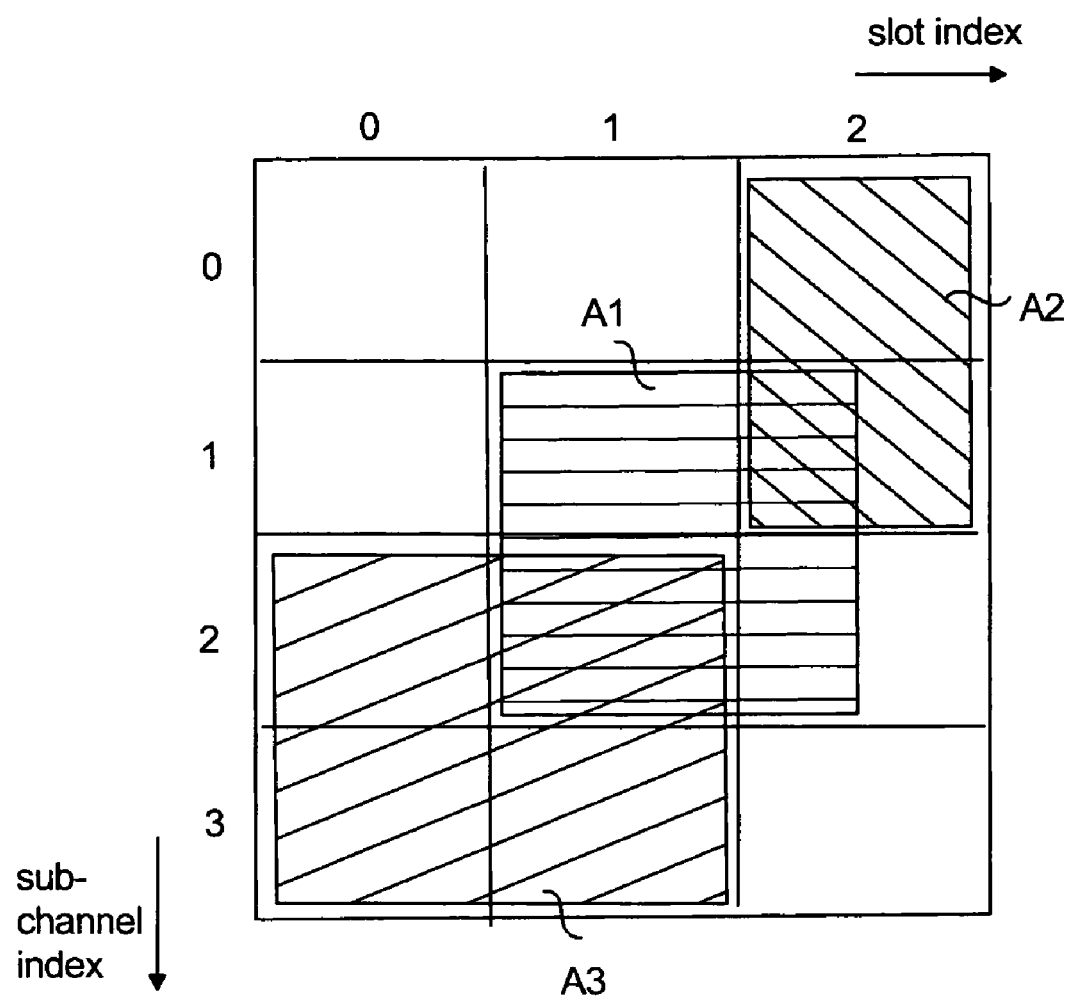
FIG. 3 illustrates frame allocation according to an embodiment of the invention.

FIGS. 2 and 3 illustrate channel allocation according to an embodiment of the present solution. In the method, map messages are transmitted at the beginning of frames from the base station BS to the user terminal UE. The map message comprises information on one or more slots that are allocated to the user terminal UE.

Referring to FIG. 2, one or more allocations are predefined 2-1, and each allocation indicates locations of one or more slots. The allocations may or may not overlap with each other (a slot may belong to one or more allocations). Based on the allocations, one or more allocation sets are defined 2-2 such that each allocation set includes at least one allocation. The allocation sets may or may not overlap with each other (an allocation) may belong to one or more allocation sets). Steps 2-1 and/or 2-2 may be performed during a connection set-up phase, during a connection maintenance phase and/or during a system specification phase. In step 2-3, an allocation set is assigned for a connection, and in step 2-4 information on the assigned allocation set is provided to the respective user terminal. Steps 2-3 and/or 2-4 may be performed during the set-up of the connection and/or during a connection maintenance phase, independently of other connections (an allocation set may be assigned to one or more connections). In step 2-5, selected allocations in the assigned allocation set are activated for a connection by transmitting a map message within a frame to the user terminal. Step 2-5 is preferably performed for every transmitted frame. One or more allocations in the assigned allocation set may activated for particular connection. However, it is also possible that a frame contains no activated allocations for a particular connection. The allocations activated in a frame are not overlapping with each other.

Referring to FIG. 3, the method according to an embodiment of the present solution is illustrated by way of example. In FIG. 3, the "horizontal" slot index 0, 1, 2 illustrate the time dimension of the slot/frame, and the "vertical" sub-channel index 0, 1, 2, 3 illustrates the frequency dimension of the slot/frame. In this example, allocations are defined as follows:

Allocation A1: MCS=X, location={(1,1),(1,2),(2,1),(2,2)}
Allocation A2: MCS=Y, location={(0,2),(1,2)}
...
Allocation An: MCS=Z, location={(2,0),(2,1),(3,0),(3,1)}
Then allocations sets are formed:
Allocation set S1: {A1, A2, A3}
Allocation set S2: {A2, A3, A4}
...
Allocation set Sm: {An-2, An}
Then the allocations sets are assigned for connections:
Assign: S2 for connection C1
Assign: Sm-3 for connection C2
Selected allocations are activated in the map message as follows:
Activate: $1^{st}$ and $3^{rd}$ allocation for connection C1 (from allocation set S2)
Activate: $1^{st}$ allocation for connection C2 (from allocation set Sm-3)

The present solution relates to allocation of transmission channels, meaning assigning/reserving channel resources to a specific task. An allocation map refers to an array containing a description on the use of system resources. An allocation map may include, for example, information on a reserved (or free) memory block and/or an indication on who has made the reservation. The present solution involves optimizing map messages. The part of a map message to be optimized preferably includes following allocation information: 1) location and size, 2) CID (=identity of the connection to which the allocation is dedicated), and 3) MCS (=modulation and coding scheme), such as QPSK1/2 with CC coding (convolution coding)). According to the IEEE 802.16e standard, in a regular map message, 32 bits in uplink and 57 bits in downlink are used for the above allocation information. In downlink, the allocation (also referred to as a "burst") has a rectangular shape expressed as a symbol offset (8 bits), a sub-channel offset (6 bits), a number of sub-channels (6 bits), and a number of slots in time direction (7 bits). In uplink, the allocations follow each other, and the location of a slot is expressed as duration (10 bits). Both in downlink and uplink, also the CID (16 bits), the MCS (4 bits), and a repetition (2 bits) are included in the map message.

Basically, predefined allocation sets are only needed in a case where there are a lot of small allocations. In practice, small allocations are needed in a case where the MCS (i.e. when a slot carries a large number of bytes) is high and where there only exists a small amount of non-delay-tolerant data to be sent (i.e. data that cannot be buffered for long periods of time). In this case, the number of the predefined allocation sets could be minimized. An example of such a case is VoIP traffic. With a typical voice codec, a packet inter-arrival time is 20 ms and a packet size is approximately 60 bytes (including the overhead and payload of IP, UDP (User Datagram Protocol), and RTP (Real-time Transport Protocol)). The voice traffic has a very small delay tolerance (<100 ms), and it is preferable to reserve time for retransmissions, so it may be assumed that per VoIP user at least 120 bytes have to be sent every 40 ms.

In the following, the present solution will be discussed, by way of example, with reference to VoIP cases in which the allocation size is from 100 bytes to 140 bytes and the number of slots is from 1 to 15. These cases are shown below in Table 1 when using WiMAX CC (convolution coding).

TABLE 1

Allocation size/byte

| Number of slots | MCS | | | | | | |
|---|---|---|---|---|---|---|---|
| | QPSK-½ | QPSK-¾ | 16QAM-½ | 16QAM-¾ | 64QAM-½ | 64QAM-⅔ | 64QAM-¾ |
| 1 | 6 | 9 | 12 | 18 | 18 | 24 | 27 |
| 2 | 12 | 18 | 24 | 36 | 36 | 48 | 54 |
| 3 | 18 | 27 | 36 | 54 | 54 | 72 | 81 |
| 4 | 24 | 36 | 45 | 72 | 72 | 96 | <u>108</u> |
| 5 | 30 | 45 | 60 | 90 | 90 | <u>120</u> | <u>135</u> |
| 6 | 36 | 54 | 72 | <u>108</u> | <u>108</u> | 144 | 162 |
| 7 | 42 | 63 | 84 | <u>126</u> | <u>126</u> | 168 | 189 |
| 8 | 48 | 72 | 96 | 144 | 144 | 192 | 216 |
| 9 | 54 | 81 | <u>108</u> | 162 | 162 | 216 | 243 |
| 10 | 60 | 90 | <u>120</u> | 180 | 180 | 240 | 270 |
| 11 | 66 | 99 | <u>132</u> | 198 | 198 | 264 | 297 |
| 12 | 72 | <u>108</u> | 144 | 216 | 216 | 288 | 324 |
| 13 | 78 | <u>117</u> | 156 | 234 | 234 | 312 | 351 |
| 14 | 84 | <u>126</u> | 168 | 252 | 252 | 336 | 378 |
| 15 | 90 | <u>135</u> | 180 | 270 | 270 | 360 | 405 |

In Table 1, the VoIP cases with the allocation size of 100 . . . 140 bytes are underlined. In this case, only 14 cases match the requirements. Therefore 4 bits would be enough to cover information of allocation size and MCS. Depending on how much freedom is needed for the locations of the allocations, for example with 4 bits it is possible to have 16 optional locations, which is enough in most cases since different bitmaps (and locations) could be assigned at the beginning of the connection to the different terminals. Thus already a one-byte bitmap would be sufficient to define the location, the size and the MCS of the allocation. In addition to this, another bitmap is needed for specifying whether the allocation bitmap for a particular connection is present or not.

In an example how the allocation map could be implemented it is assumed that 256 active VoIP connections are to be supported. Assuming a 10-ms frame length, this would mean a maximum of 64 connections per frame (with the 40-ms transmission interval). The connections could be divided, for example, into 8 groups (64 connections per group). With 8 bits, it would be possible to define which groups are active in a frame (or if only one active group per frame is required, 3 bits would be enough). If a group is active, another bitmap will follow (in the order of group ids), describing which connections are active for the group. If a connection is active, a third bitmap will follow (firstly, in the order of group ids; secondly, in the order of connection ids in a semi-static allocation map assigned in the connection setup). The third bitmap would define an allocation id (which defines the location, size and MCS of the connection). In this simplified example, there are 4 active connections: A and B that belong to group 1 (G1), B and C that belong to group 3. The connection A has an allocation id=3, the connection B an allocation id=1, the connection C an allocation id=3, and the connection D an allocation id=8. It should be noted that even if the connections A and C have the same allocation id, they have different allocations since they have a different interpretation of the allocation id. The interpretation of the allocation id may be assigned during the connection setup. For example, in the specification, there could be a set of different interpretations referred to in the connection setup.

For example, in the WiMAX system, there may be 240 slots per sector in downlink and 192 slots per sector in uplink (bandwidth=10 MHz; PUSC (Partial usage of sub-channels) reuse=1-3-3; TDD (Time division duplex) UL/DL ratio=1; frame=10 ms). If the user terminal has a mandatory CC coding and an MCS of 64QAM-3/4 (the highest MCS in WiMAX), this means that there are 27 bytes per slot. Therefore an allocation of 5 slots would be needed in every 4th frame if the user is active (during "talking period"), and no allocations would be needed when the user is inactive (during "silent period"). This means that in a worst case there could be 48 allocations in a DL frame (assuming one allocation per user) and 38 allocations in a UL frame. In this case, the DL-map has to be sent with the MCS of QPSK-1/2 (=6 bytes/slot) and possibly with a repetition coding of 2, 4 or 6. Thus, without repetition, this would mean that 23, 75% of the DL capacity (maximum=(48×57/(8×6))/240) is wasted for the DL-map without repetition coding, 47, 5% with the repetition coding of 2, and 95% with the repetition coding of 4. The repetition coding of 6 would not even be possible. The UL-map size may be calculated similarly (and it is added to the map overhead). Even though this is an extreme case (typically, there are not very many 64QAM-3/4 users), it is clear that the size of the overhead is a significant feature. In this example, the size of the DL-map could, in a worst case, be only 4, 17% of the DL capacity (maximum=((8+64+48×8)/(8×6))/240) without repetition coding, 8, 33% with the repetition coding of 2, 16% with the repetition coding of 4, and 25% with the repetition coding of 6. Thus the overhead of the DL-map would be approximately 6 times smaller than that of the conventional DL-map of the WiMAX system. This would significantly improve the VoIP capacity.

It should be noticed that in the DL of the WiMAX, it is also possible to group allocations such that several connections have a common allocation. This may significantly reduce the map overhead, but a drawback is that the user terminal has to receive transmissions that belong to other terminals. Furthermore, a similar approach is also possible for the semi-static maps. In the uplink of the WiMAX, the allocations have to follow each other in time and possibly continue on the next sub-channel. Therefore an implementation of the semi-static map, which is slightly different from the downlink implementation, is required. For example, there could be 4 bits for defining the size (i.e. the duration), and then the MCS and the location would be explicitly defined by the order of the CID bitmaps. In this case, for example, 8 bits would be enough to support the 256 active semi-static connections. Extra 6 bits would be needed to define how many allocations there are, assuming a maximum of 64 connections per frame. Thus the UL-map size would be 6+n×12 bits, where n is the number of the active connections per frame. This is significantly (roughly 3 times) less that with the conventional UL-map of the WiMAX (n×32 bits).

According to an embodiment, the present solution is also applicable to other systems, such as OFDM-based systems.

According to an embodiment, the present solution is applicable to downlink frames and/or uplink frames.

The items and steps shown in FIGS. 2 and 3 are simplified and aim only at describing the idea of the invention. Other items may be used and/or other functions carried out between the steps. The items serve only as examples and they may contain only some of the information mentioned above. The items may also include other information, and the titles may deviate from those given above. Instead of or in addition to a base station, above described operations may be performed in any other element of a cellular communications system.

In addition to prior art means, a system or system network nodes that implement the functionality of the invention comprise means for processing information relating to the channel allocation in a manner described above. Existing network nodes and user terminals comprise processors and memory that can be utilized in the operations of the invention. Any changes needed in implementing the invention may be carried out using supplements or updates of software routines and/or routines included in application specific integrated circuits (ASIC) and/or programmable circuits, such as EPLDs (Electrically Programmable Logic Device) or FPGAs (Field Programmable Gate Array).

It will be obvious to a person skilled in the art that, as the technology advances, the inventive concept can be implemented in various ways. The invention and its embodiments are not limited to the examples described above but may vary within the scope of the claims.

The invention claimed is:

1. A method, comprising:
   setting up a connection between a base station and a user terminal in a radio access network of a cellular communications system;
   transmitting map messages within frames from the base station to the user terminal;
   predefining one or more allocations, each allocation indicating locations of one or more selected frame slots, and at least one allocation indicating a location of more than one frame slot;
   defining one or more allocation sets, each set including at least one allocation;
   assigning an allocation set for the connection;
   providing information on the assigned allocation set to the respective user terminal;
   activating, if needed, one or more of the allocations in the assigned allocation set by transmitting a map message in a selected frame to the user terminal, the map message identifying the allocation to be activated;
   defining a first bitmap for defining a location, size and modulation and coding scheme for the allocation, and
   defining a second bitmap for specifying whether the first bitmap for a particular connection is used or not.

2. A method according to claim 1, wherein the information on the assigned allocation set comprises information on the modulation and coding schemes MCS used for the allocations in the assigned allocation set.

3. A method according to claim 1, wherein the method comprises assigning a semi-static allocation set to a user terminal.

4. A method according to claim 1, wherein the method comprises defining the allocation set during a connection set-up.

5. A method according to claim 1, wherein the method comprises defining the allocation set during a specification phase of the system.

6. A method according to claim 1, wherein the method comprises defining the allocation set during a connection maintenance phase.

7. A method according to claim 1, wherein the method comprises optimizing the location of the allocated slots in a frame.

8. A method according to claim 1, wherein the predefined allocations overlap with each other.

9. A method according to claim 1, wherein the allocation sets overlap with each other.

10. A method according to claim 1, wherein activated allocation sets are non-overlapping.

11. A method according to claim 1, wherein the method comprises optimizing the size of a map message in a VoIP system.

12. A method according to claim 1, wherein the method comprises optimizing the size of a map message in a WiMAX system.

13. A method according to claim 1, wherein the slot has a time dimension.

14. A method according to claim 1, wherein the slot has a frequency dimension.

15. A method according to claim 1, wherein the allocation has a time dimension.

16. A method according to claim 1, wherein the allocation has a frequency dimension.

17. A method, comprising:
    setting up a connection between the base station and a user terminal;
    transmitting map messages within frames from the base station to the user terminal;
    predefining one or more allocations, each allocation indicating locations of one or more selected frame slots, and at least one allocation indicating a location of more than one frame slot;
    defining one or more allocation sets, each set including at least one allocation;
    assigning an allocation set for the connection;
    providing information on the assigned allocation set to the respective user terminal;

activating, if needed, one or more of the allocations in the assigned allocation set by transmitting a map message in a selected frame to the user terminal, the map message identifying the allocation to be activated;

dividing connections into groups, defining a first bitmap indicating which groups are active in a selected frame, defining a second bitmap for each active group, the bitmap describing which connections are active for the group, and if a connection is active the group, defining a third bitmap in the order of group identities and in the order of connection identities, wherein the third bitmap defines the location, size and MCS of the connection.

18. A system, comprising:

a user terminal, and a radio access network further comprising a base station, wherein the system is configured to set up a connection between the base station and the user terminal, transmit map messages within frames from the base station to the user terminal, predefine one or more allocations, each allocation indicating locations of one or more selected frame slots, and at least one allocation indicating a location of more than one frame slot, define one or more allocation sets, each set including at least one allocation, assign an allocation set for the connection, provide information on the assigned allocation set to the respective user terminal, activate, if needed, one or more of the allocations in the assigned allocation set by transmitting a map message in a selected frame to the user terminal, the map message identifying the allocation to be activated, define a first bitmap for defining a location, size and modulation and coating scheme for the allocation, and define a second bitmap for specifying whether the first bitmap for a particular connection is used or not.

19. A system according to claim 18, wherein the information on the assigned allocation set comprises information on the modulation and coding schemes MCS used for the allocations in the assigned allocation set.

20. A system according to claim 18, wherein the system is configured to define the allocation set during a connection set-up.

21. A system according to claim 18, wherein the system is configured to define the allocation set during a specification phase of the system.

22. A system according to claim 18, wherein the system is configured to define the allocation set during a connection maintenance phase.

23. A system according to claim 18, wherein the system utilizes OFDMA technique.

24. A system according to claim 18, wherein the system utilizes OFDM technique.

25. An apparatus, wherein the apparatus is disposed in a radio access network capable of setting up a connection between a base station and a user terminal, and transmitting messages within frames from the base station to the user terminal, and wherein the apparatus configured to predefine one or more allocations, each allocation indicating locations of one or more selected frame slots, and at least one allocation indicating a location of more than one frame slot;

define one or more allocation sets, each set including at least one allocation;

assign an allocation set for the connection;

provide information on the assigned allocation set to the respective user terminal;

activate, if needed, one or more of the allocations in the assigned allocation set by transmitting a map message in a selected frame to the user terminal, the map message identifying the allocation to be activated, define a first bitmap for defining a location, size and modulation and coding scheme for the allocation, and define a second bitmap for specifying whether the first bitmap for a particular connection is used or not.

26. An apparatus according to claim 25, wherein it is configured to assign a semi-static allocation set to a user terminal.

27. An apparatus according to claim 25, wherein it is configured to define the allocation set during a connection set-up.

28. An apparatus according to claim 25, wherein it is configured to define the allocation set during a specification phase of a system.

29. An apparatus according to claim 25, wherein it is configured to define the allocation set during a connection maintenance phase.

30. An apparatus according to claim 25, wherein it is configured to optimize the location of the allocated slots in a frame.

31. An apparatus according to claim 25, wherein it is configured to optimize the size of a map message in a VoIP system.

32. An apparatus according to claim 25, wherein it is configured to optimize the size of a map message in a WiMAX system.

33. An apparatus according to claim 25, wherein it comprises a base station.

34. An apparatus, wherein the apparatus is disposed in a radio access network capable of setting up a connection between a base station and a user terminal, and transmitting messages within frames from the base station to the user terminal, and wherein the apparatus configured to predefine one or more allocations, each allocation indicating locations of one or more selected frame slots, and at least one allocation indicating a location of more than one frame slot;

define one or more allocation sets, each set including at least one allocation;

assign an allocation set for the connection;

provide information on the assigned allocation set to the respective user terminal;

activate, if needed, one or more of the allocations in the assigned allocation set by transmitting a map message in a selected frame to the user terminal, the map message identifying the allocation to be activated;

divide connections into groups, define a first bitmap indicating which groups are active in a selected frame, define a second bitmap for each active group, the bitmap describing which connections are active for the group, and if a connection is active for the group, define a third bitmap in the order of group identities and in the order of connection identities, wherein the third bitmap defines the location, size and MCS of the connection.

* * * * *